United States Patent [19]
Pan

[11] Patent Number: 5,812,712
[45] Date of Patent: Sep. 22, 1998

[54] FIBER BRAGG GRATING-CIRCULATOR SYSTEMS HAVING REDUCED ASE

[75] Inventor: Jing-Jong Pan, Milpitas, Calif.

[73] Assignee: E-Tek Dynamics, Inc., San Jose, Calif.

[21] Appl. No.: 806,299

[22] Filed: Feb. 26, 1997

[51] Int. Cl.⁶ .................................................. C02B 6/26
[52] U.S. Cl. .............................................. 385/37; 385/15
[58] Field of Search .................................. 385/37, 2, 24, 385/10, 15; 250/227.18, 227.14; 359/337

[56] References Cited

U.S. PATENT DOCUMENTS

| | | | |
|---|---|---|---|
| 5,283,686 | 2/1994 | Huber | 359/337 |
| 5,561,546 | 10/1996 | Esman | 385/2 |
| 5,600,473 | 2/1997 | Huber | 385/10 |
| 5,706,375 | 1/1998 | Mihailov et al. | 385/24 |

OTHER PUBLICATIONS

Pan et al., "Tunable $Er^{3+}$–doped fibre ring laser using fibre grating incorporated by optical circulator or fibre coupler," *Electronic Letters* (1995) 31:1164–1165.

*Primary Examiner*—John Ngo
*Attorney, Agent, or Firm*—Townsend and Townsend and Crew LLP

[57] ABSTRACT

A light source system for fiberoptic networks is presented. The system has a laser light source, an optical circulator, an optical fiber section having at least one fiber Bragg grating, and an output port. The optical circulator receives light through its first port and passes the light to the circulator's second port and light received through the second port is passed to the circulator's third port. The first port is connected to the light source. The optical fiber section is connected to the second port and the fiber Bragg grating has a reflectivity centered about a predetermined wavelength. The third port, which is unconnected to the light source, is connected to the output port of the system. Light from the output port has the predetermined wavelength with significantly reduced ASE.

11 Claims, 6 Drawing Sheets

5,812,712

FIBER BRAGG GRATING-CIRCULATOR SYSTEMS HAVING REDUCED ASE

BACKGROUND OF THE INVENTION

The present invention is related to the field of light sources for fiberoptic networks and, more particularly, to laser sources having a low ASE (amplified spontaneous emission) noise.

Lasers or devices using lasing action, e.g., erbium-doped fiber amplifiers, are commonly used in fiberoptic networks as light sources. A common source of noise which corrupts the message signal from the light source is ASE (amplified spontaneous emission). ASE arises across the wavelength bands and seriously degrades the signals in the fiberoptic network. This is especially true in modern fiberoptic networks, which are moving toward light signals having very narrow bandwidths, i.e., signals having wavelengths concentrated in a very narrow portion of the optical spectrum. For instance, in the recently proposed standard by the ITU (International Telecommunications Union), a dense WDM (Wavelength-Division Multiplexed) network is to carry light signals separated by only 0.8 nm in wavelength. Light sources for such networks should have a very narrow bandwidth.

To counter ASE, conventional bandpass filters have been used with light sources. However, there are disadvantages with such solutions. Present bandpass filters are expensive. The fabrication of bandpass filters which are narrowband has been difficult. Other performance requirements have added to fabrication difficulties. For example, since the bandpass filter might be placed at the output of a semiconductor laser, the filter should have low back reflection to prevent adversely affecting the operation of the laser. Additionally, the filter should have transmissivity of less than 0.01% for wavelengths outside the band for effective removal of noise from the desired output signal. Furthermore, previous bandpass filters have required collimators which have added to construction complexity.

To overcome these shortcomings, the present invention provides for a system for generating light highly suitable for present day fiberoptic networks. The system is manufactured with components in other optical systems. Nonetheless, the performance far exceeds previous bandpass filter systems. The system of the present invention has an output with greatly reduced ASE and a very narrow bandwidth.

SUMMARY OF THE INVENTION

The present invention provides for a system for generating light for a fiberoptic network. The system has a laser light source, an optical circulator, an optical fiber section having a fiber Bragg grating, and an output port. The optical circulator has first, second and third ports arranged so that light received through the first port is passed to the second port and light received through the second port is passed to the third port. The first port is connected to the light source. The optical fiber section is connected to the second port and the fiber Bragg grating has a reflectivity centered about a predetermined wavelength. The third port, which is unconnected to the light source, is connected to the output port of the system. Light from the output port has the predetermined wavelength with significantly reduced ASE.

Furthermore, the present invention also provides for a multiwavelength system in which the optical fiber section has a plurality of fiber Bragg gratings with each fiber Bragg grating having a reflectivity centered about different predetermined wavelengths. The output of this system is at the predetermined wavelengths with ASE also reduced.

DETAILED DESCRIPTION OF SPECIFIC EMBODIMENTS

Figure 1A:
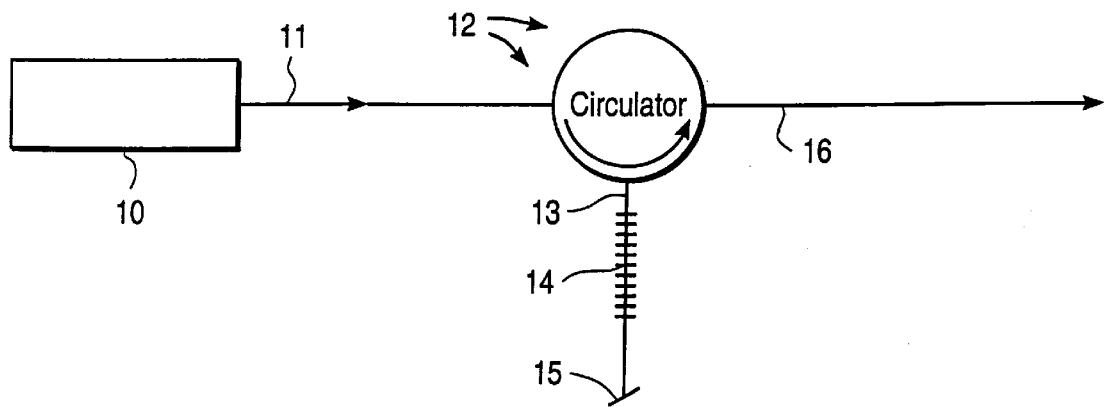
FIG. 1A is a representational diagram of a light source system having a laser source, according to one embodiment of the present invention.

FIG. 1A illustrates a system according to one embodiment of the present invention. The system has a laser source 10 connected by an optical fiber 11 to the first port of an optical circulator 12. The second port of the circulator 12 is connected to an optical fiber section 13, which has a fiber Bragg grating 14 and which has a nonreflecting end terminal 15. The third port of the circulator 12 is connected to an optical fiber 16 which carries the laser output, which has passed through the circulator 12 and been acted upon by the fiber Bragg grating 14.

A fiber Bragg grating is a periodic variation in the index of refraction (or the propagation constant) in the core of an optical fiber. Fiber Bragg gratings can have a very high reflectivity in a very narrow bandwidth about a predetermined wavelength. Light at other wavelengths are transmitted through the fiber Bragg grating. The fiber Bragg grating 14 has a reflectivity centered about a wavelength which is also the wavelength with the maximum output intensity of the laser source 10.

Figure 1B:
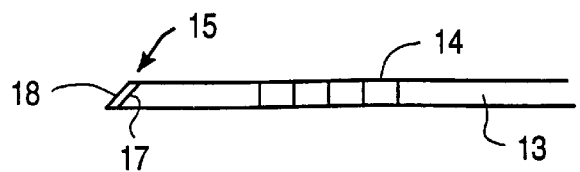
FIG. 1B is a detail of the optical fiber section of the system of FIG. 1A.

FIG. 1B details the terminal 15 of the fiber section 13. The optical fiber section 13 ends in a surface 17 which is angled 10–12° to the plane perpendicular of the longitudinal axis of the fiber 13. The end surface 17 of the fiber 13 is slant-polished (as shown in an exaggerated fashion) and covered with an anti-reflection coating 18. This allows any light which reaches the end surface 17 to leave the fiber 13. Hence only the light reflected by the fiber Bragg grating 14 is returned to the optical circulator 12.

As in any optical circulator, the optical circulator 12 transmits any light received through its first port out through its second port. Likewise, any light received through its second port is transmitted output through its third port. The arrow in the drawing shows the "direction" of light transmittal between the ports of the optical circulator 12. A suitable optical circulator is described in U.S. application No. 08/542,571, entitled "POLARIZATION MODE DISPERSION-FREE CIRCULATOR", filed Oct. 13, 1995 by J. J. Pan et al., and a continuation-in-part patent application, U.S. application No. 08/701,909, filed Sep. 6, 1996 and entitled "COMPACT FIBEROPTIC CIRCULATOR WITH LOW POLARIZATION MODE DISPERSION." Both applications are assigned to the present assignee.

The combination of an optical circulator and fiber Bragg grating was described as part of a laser source, i.e., a fiber ring laser, by one of the inventors in an article, "Tunable $Er^{3+}$-doped fibre ring laser using fibre grating incorporated by optical circulator or fibre coupler," by J. J. Pan and Yuan Shi, *Electronics Letters*, Vol. 31, No. 14, Jul. 6, 1995, pp. 1164–1165. In the present invention the optical circulator 12 and fiber Bragg grating 14 are removed from the laser source 10, while conditioning its output.

Light on the fiber 11 from the laser source 10 is received through the first port of the optical circulator 12 and transmitted through its second port to the fiber section 13. The fiber Bragg grating 14 in the fiber section 13 reflects light in a very narrow bandwidth about a predetermined wavelength back into the second port. Light at other wavelengths is lost through the terminal 15. The circulator 12 passes the reflected light out through the third port and the output optical fiber 16.

Figure 2A:
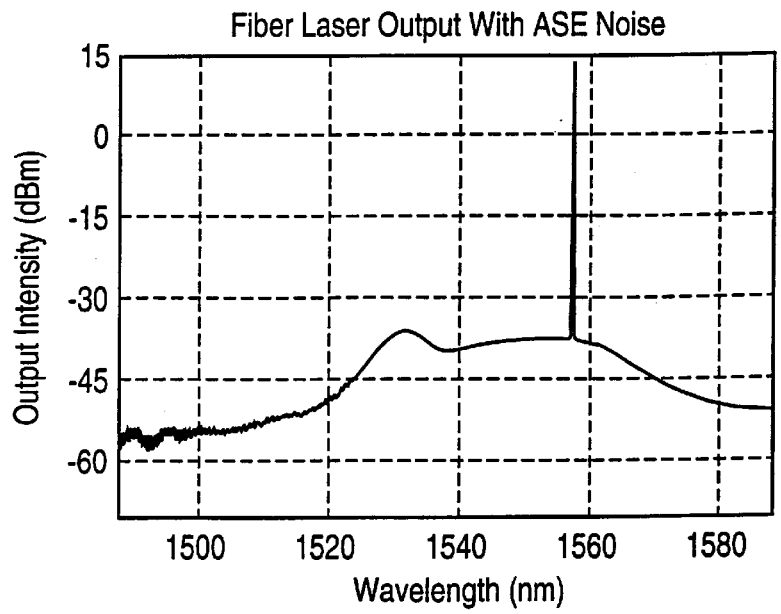
FIG. 2A is a graph of output intensity versus wavelength for a fiber laser.
Figure 2B:
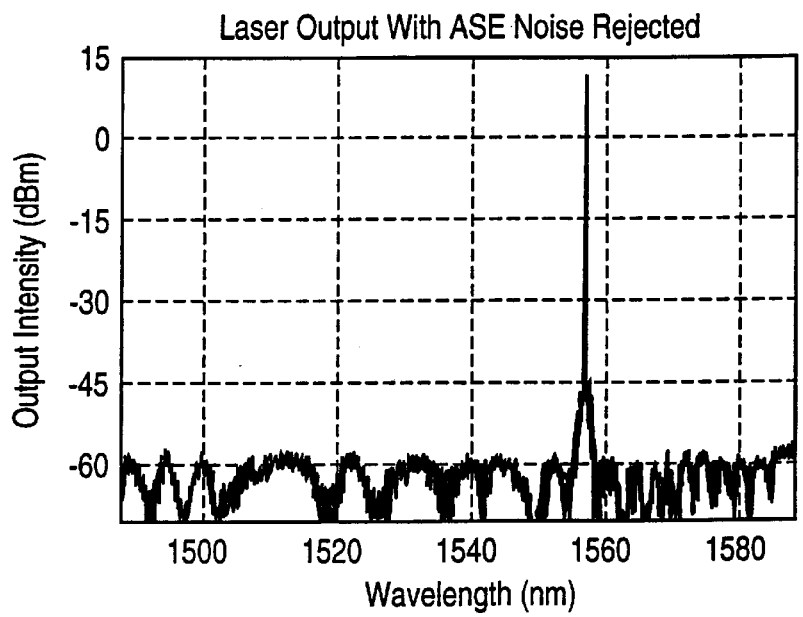
FIG. 2B is a graph of output intensity versus wavelength for the output of the FIG. 1 system with the fiber laser of FIG. 2A, according to the present invention.
Figure 3A:
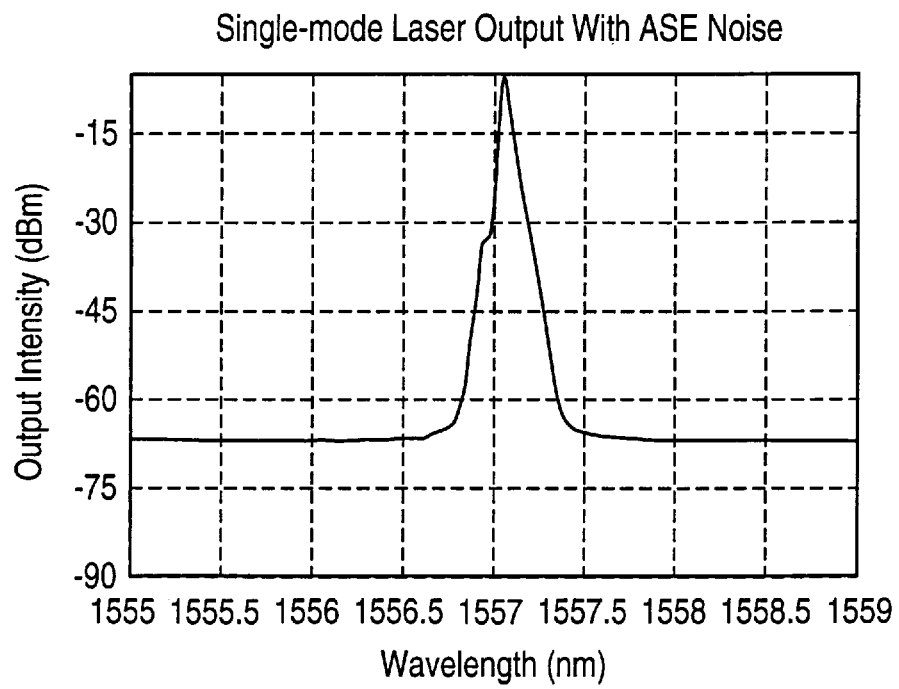
FIG. 3A is a graph of output intensity versus wavelength for a single-mode semiconductor laser.
Figure 3B:
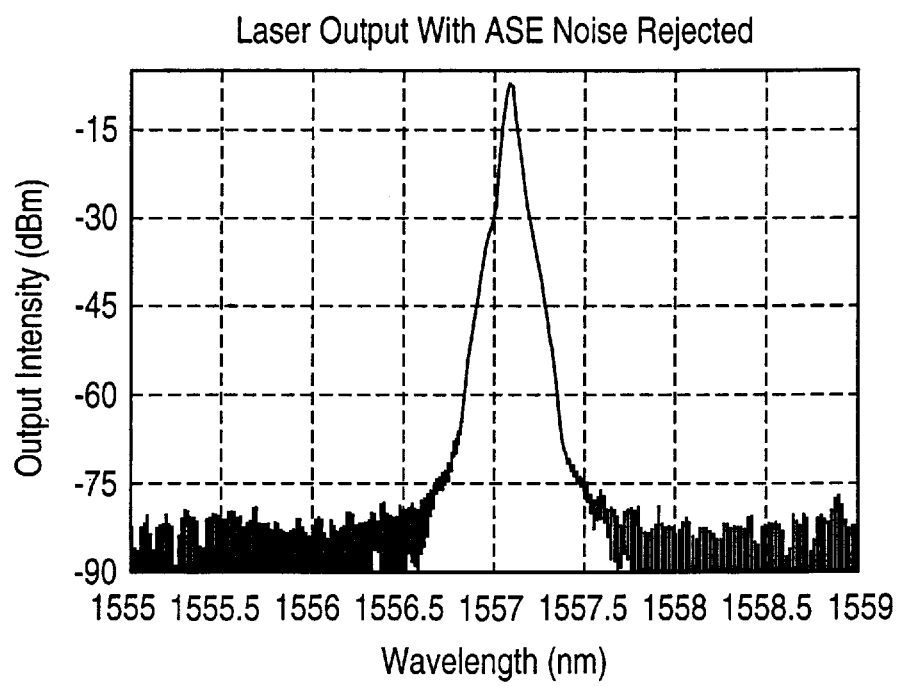
FIG. 3B is a graph of output intensity versus wavelength for the output of the FIG. 1 system with the single-mode semiconductor laser of FIG. 3A, according to the present invention.

FIGS. 2A–2B, 3A–3B, and 4A–4B are graphs illustrating the marked reduction in ASE in the system of FIG. 1A. FIG. 2A illustrates the unconditioned output intensity versus wavelength of a fiber laser, such as a DFB (Distributed FeedBack) or DBR (Distributed Bragg Reflectors) fiber laser. When inserted as the laser source 10 in the FIG. 1A system, the output intensity is improved considerably. As shown in FIG. 2B, the ASE noise falls to −60 dBm from an average of approximately −45 dBm in the wavelength range plotted in FIG. 2A. FIG. 3A shows the output intensity of a laser diode having a single mode output. The background ASE noise is above −70 dBm. When used as the laser source 10 in the FIG. 1A system, the background ASE noise of the laser diode falls far below −75 dBm, as shown in FIG. 3B.

Figure 4A:
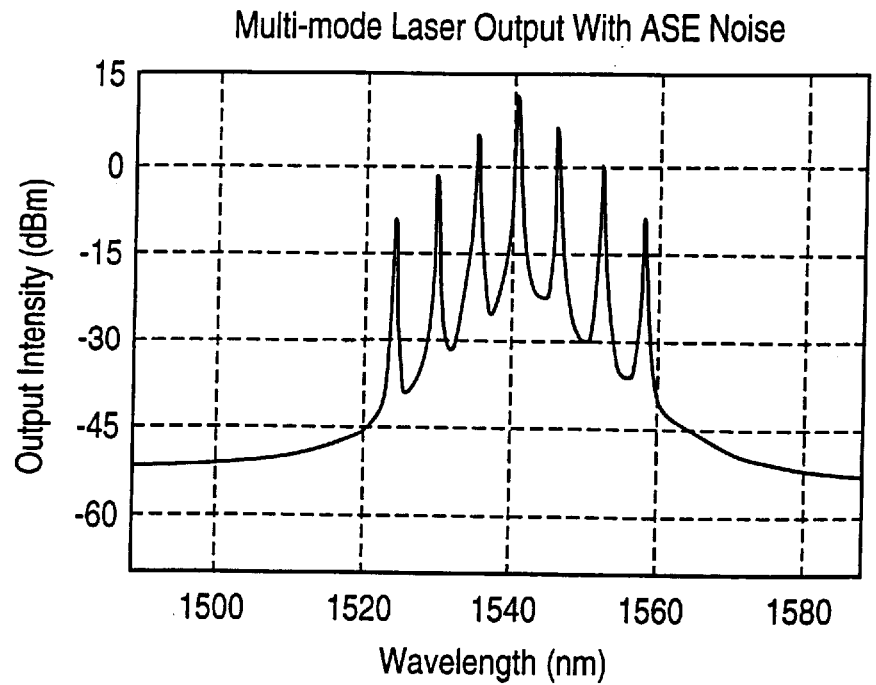
FIG. 4A is a graph of output intensity versus wavelength for a multi-mode semiconductor laser.
Figure 4B:
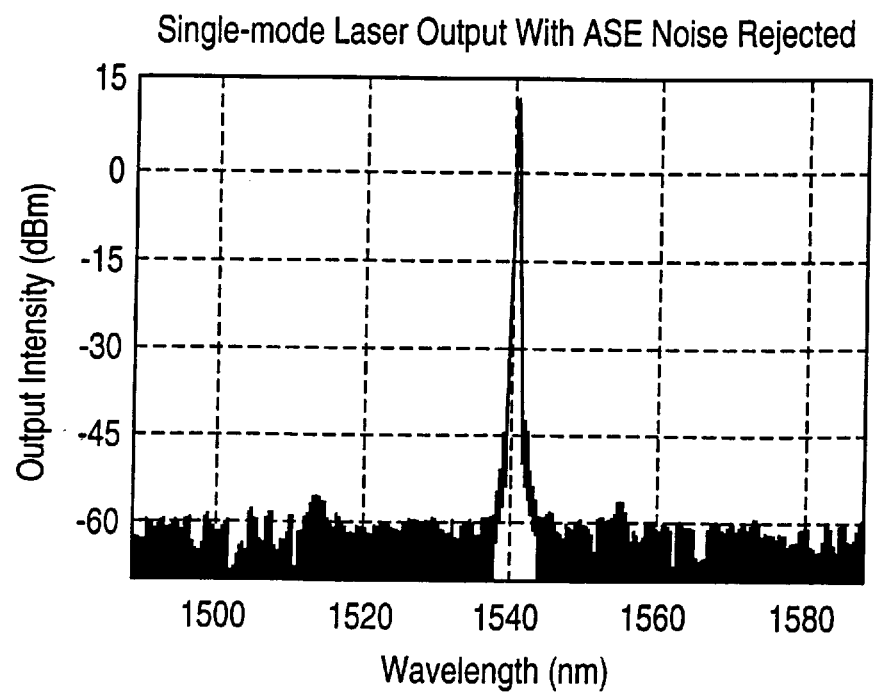
FIG. 4B is a graph of output intensity versus wavelength for the output of the FIG. 1 system with the multi-mode semiconductor laser of FIG. 4A, according to the present invention.

The output intensity of a multimode laser diode is illustrated in FIG. 4A. Being multimode, the laser diode has several output spikes. The ASE noise is slightly better than −50 dBm. In contrast, when used in the FIG. 1A system, the output intensity has a single output "spike" (the other modes having been removed) and the ASE noise reduced to −60 dBm.

Figure 5:
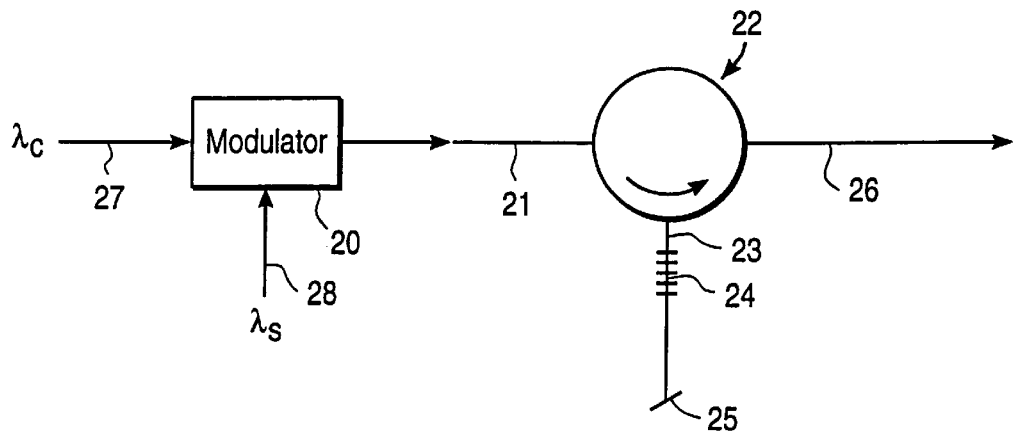
FIG. 5 is a diagram of a light source system having a wavelength converter/modulator, according to an embodiment of the present invention.

The present invention includes other high-performance systems. In FIG. 5 the system has a element 20 which receives input signals from two optical fibers 27 and 28 at different wavelengths to generate an output signal at a third wavelength. For example, the element 20 can be a modulator for a single sideband signal from the carrier signal at wavelength $\lambda_C$ on, say, the input fiber 27, and the modulating signal at wavelength $\lambda_S$ on the input fiber 28. The output from the modulator 20 is sent via a fiber 21 to the first port of an optical circulator 22. At the second port of the circulator 22, a fiber Bragg grating 24 is centered about the wavelength $\lambda_S$ of the single sideband signal. Thus only this signal is passed to the output optical fiber 26; the signal at the carrier wavelength $\lambda_C$ is removed for improved detection sensitivity of the transmitted signal on the fiber 26.

Likewise, the element 20 can operate as another wavelength conversion element, such as a four-wave mixing converter, which generates an output signal at a wavelength different from the wavelengths of the signals received by the element 20. By centering the reflectivity of the fiber Bragg grating 24 at the output signal wavelength, any signals at different wavelengths which might have leaked through the element 20 onto the fiber 21 are effectively removed by the action of the fiber Bragg grating 24. Only the signal at the desired wavelength is passed to the output fiber 26 with low noise.

Figure 6:
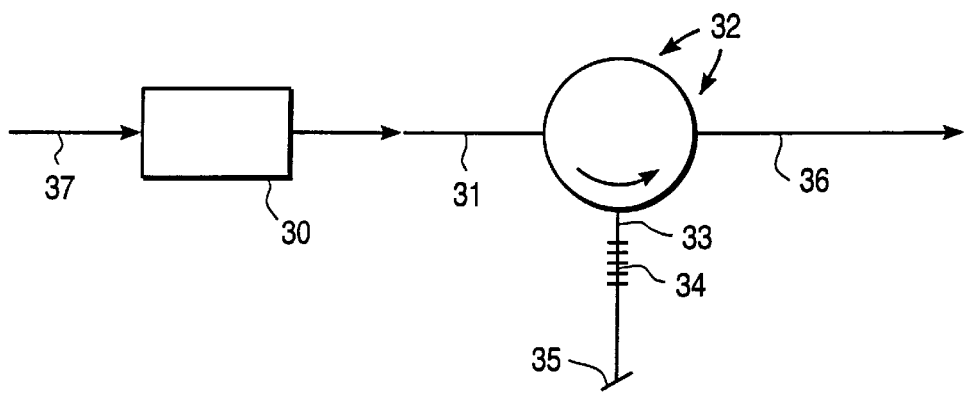
FIG. 6 is a diagram of a light source system having a nonlinear element, according to another embodiment of the present invention.

By appropriately setting the reflection wavelength of the fiber Bragg grating, the present invention can operate to reduce nonlinear effects which are undesired. FIG. 6 illustrates a system having a nonlinear element 30, such as a semiconductor optical amplifier or a fiber optical amplifier. An optical fiber 37 symbolically represents one or more inputs to the element 30. Besides an output signal at a predetermined wavelength, undesired nonlinear effects, such as four-wave or four-photon mixing, scattered power, interference, cross-modulation, and the like, may also accompany the output signal into the first port of the optical circulator 32. By centering the reflectivity of the fiber Bragg grating 34 at the second port at the predetermined wavelength of the output signal, the undesired effects are removed from the signal on the output fiber 36. The power of the ASE and spurious intensity peaks from the element 30 are reduced.

Figure 7A:
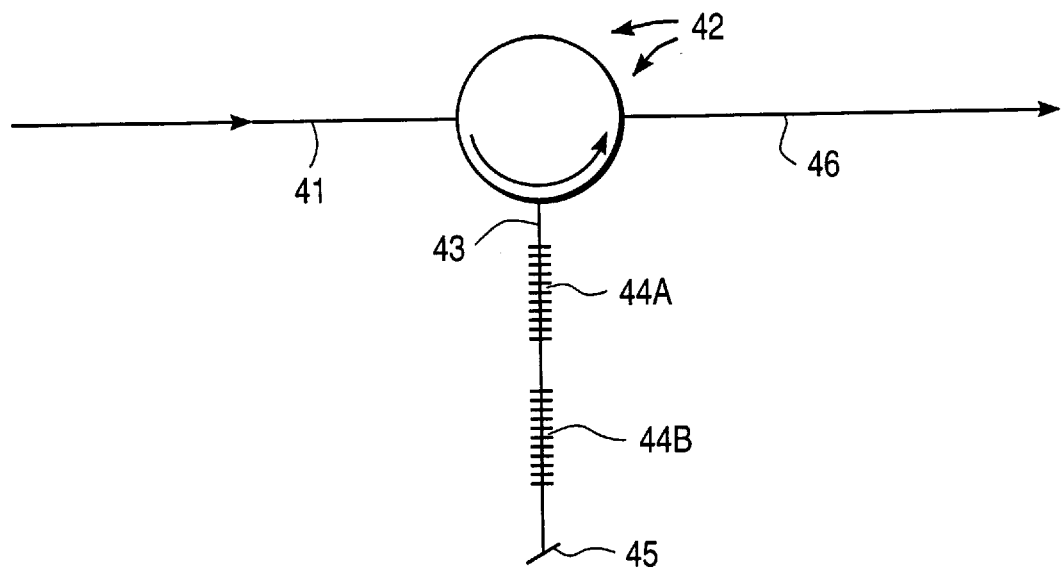
FIG. 7A is a diagram of a light source system carrying two wavelength-dependent channels according to another embodiment of the present invention.
Figure 7B:
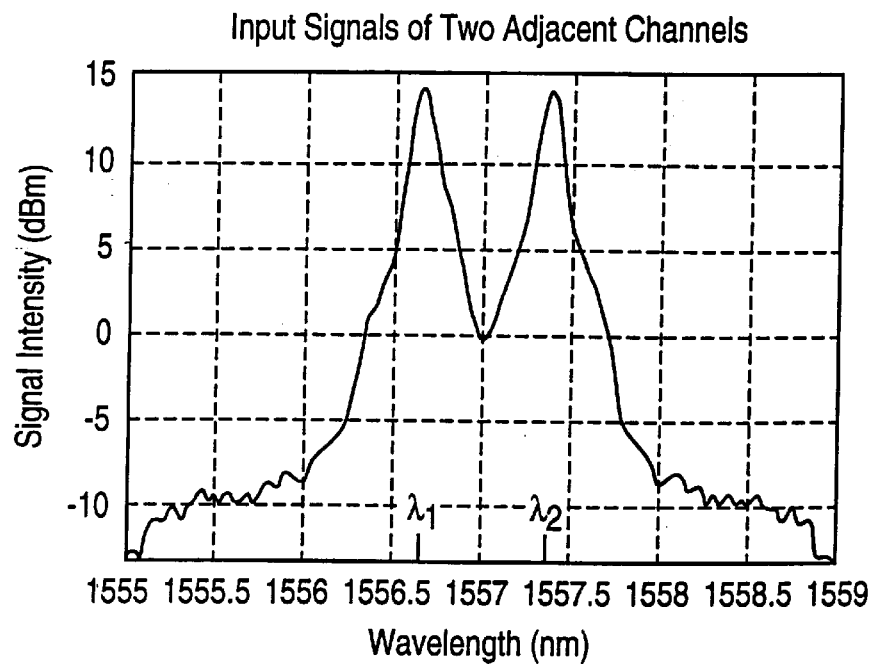
FIG. 7B is a graph of output intensity versus wavelength of the two wavelength-dependent channels.

In the exemplary system of FIG. 7A, an input optical fiber 41 carries two wavelength-dependent channels, i.e., the input fiber 41 carries signals at two different wavelengths $\lambda_1$ and $\lambda_2$, as illustrated by the FIG. 7B graph. While there are two peaks at $\lambda_1$ and $\lambda_2$, there is considerable crosstalk and noise. The fiber 41 is connected to the first port of an optical circulator 42 and the second port is connected to an optical fiber section 43 having two fiber Bragg gratings 44A and 44B. The two Bragg gratings 44A and 44B have reflectivities respectively centered about $\lambda_1$ and $\lambda_2$. The third port of the circulator 42 is connected to an output optical fiber 46.

Figure 7C:
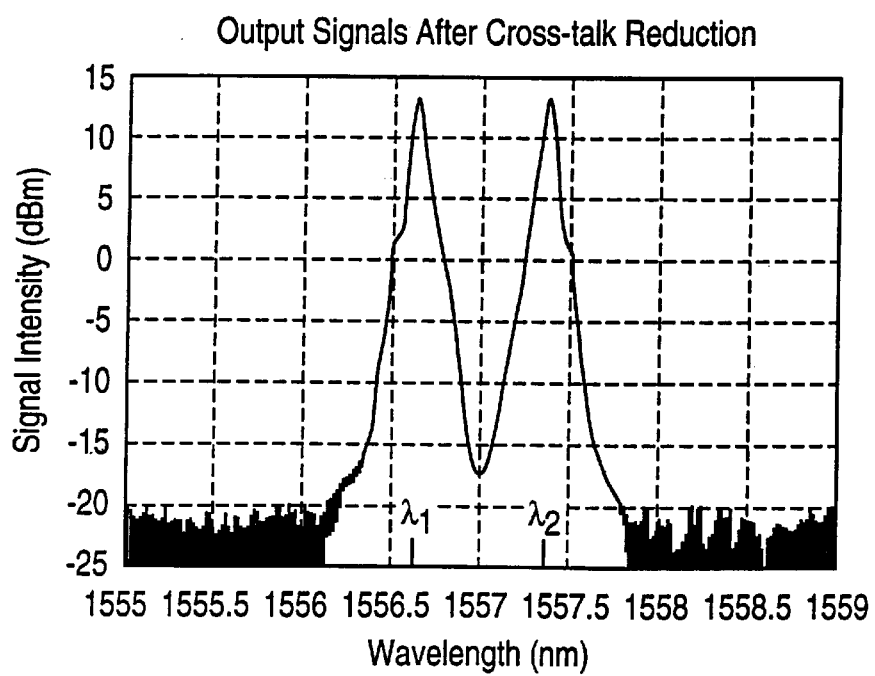
FIG. 7C is a graph of output intensity versus wavelength of the output of the FIG. 7A system.

As shown in the FIG. 7C graph, the crosstalk between the two channels is significantly reduced in the output fiber 46, along with the noise which is below −20 dBm. It should be noted that spacing between the two wavelengths is less than 0.8 nm, the proposed ITU (International Telecommunications Union) standard for wavelength spacing for dense WDM (Wavelength Division Multiplexed) networks. The application of the FIG. 7A system to such networks should be apparent. Of course, for more wavelength-dependent channels, more fiber Bragg gratings with different wavelengths can be added to the fiber section 43 for increased channel discrimination.

Figure 8:
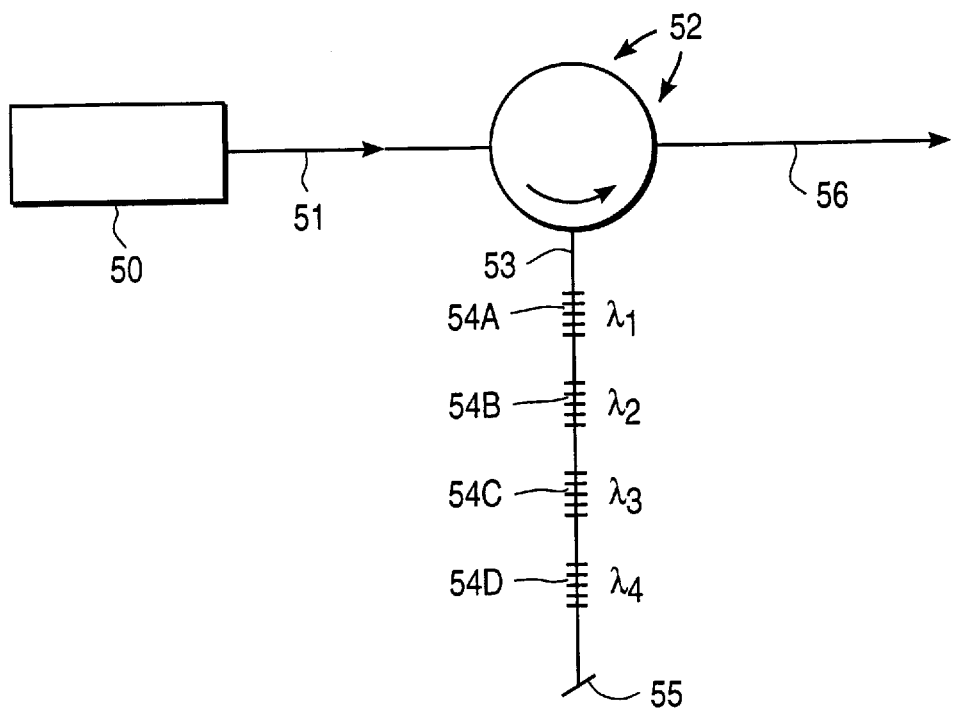
FIG. 8 is a diagram of a light source system having multiple fiber Bragg gratings, according to still another embodiment of the present invention.

FIG. 8 illustrates such a system with four fiber Bragg gratings 54A–54D in a optical fiber section 53 with a terminal 55, as previously described. The fiber gratings 54A–54D are centered about wavelengths $\lambda_1$–$\lambda_4$ respectively. However, rather than increasing the discrimination between channels as described immediately above, the fiber gratings 54A–54D reduce the ASE noise from a laser source 50 having output at the four wavelengths $\lambda_1$–$\lambda_4$. As described with respect to FIG. 1A above, the laser source 50 is connected to the first port of the optical circulator 52 by an optical fiber 51. The fiber section 53 is connected to the circulator's second port, while an output fiber 56 is connected to the third port. The output of the multiwavelength laser source 50 has a reduced ASE with outputs centered about wavelengths $\lambda_1$–$\lambda_4$. Of course, the particular number of wavelengths described here is only an example and other numbers of wavelengths may be used.

While the description above provides a full and complete disclosure of the preferred embodiments of the present invention, various modifications, alternate constructions, and equivalents will be obvious to those with skill in the art. Thus, the scope of the present invention is limited solely by the metes and bounds of the appended claims.

What is claimed is:

1. A system for generating light for a fiberoptic network, said system comprising a laser light source;

an optical circulator having first, second and third ports arranged so that light received through said first port is passed to said second port and light received through said second port is passed to said third port, said first port connected to said light source and said third port unconnected to said light source;

a section of an optical fiber connected to said second port, said optical fiber section having a fiber Bragg grating having a reflectivity centered about a predetermined wavelength, said optical fiber section having an end surface angled to a plane perpendicular to a longitudinal axis of said optical fiber section and covered with anti-reflection material; and an output port for connection to said fiberoptic network, said output port connected to said third port, so output light from said output port has said predetermined wavelength with reduced ASE.

2. The system of claim 1 wherein said optical fiber section has a plurality of fiber Bragg gratings, each fiber Bragg grating having a reflectivity centered about different predetermined wavelengths.

3. The system of claim 1 wherein said light source comprises fiber laser.

4. The system of claim 1 wherein said light source comprises single-mode semiconductor laser.

5. The system of claim 1 wherein said light source comprises multi-mode semiconductor laser.

6. The system of claim 1 wherein said light source comprises a wavelength converter.

7. The system of claim 1 wherein said light source comprises a nonlinear element.

8. The system of claim 1 wherein said light source comprises a modulator.

9. The system of claim 8 wherein said modulator comprises a single sideband modulator.

10. The system of claim 7 wherein said light source comprises a semiconductor optical amplifier.

11. The system of claim 10 wherein said light source comprises a fiber optical amplifier.

\* \* \* \* \*